*(12)* United States Patent
Stephens et al.

*(10)* Patent No.: US 6,460,896 B1
*(45)* Date of Patent: Oct. 8, 2002

(54) SEWER PIPE COUPLING

(76) Inventors: Greg Stephens, 418 Templemead Drive, Hamilton, Ontario (CA), L8W 2H2; Peter Vieveen, 363 Fitch Street, Welland, Ontario (CA), L3C 4W7

( * ) Notice: Subject to any disclaimer, the term of this patent is extended or adjusted under 35 U.S.C. 154(b) by 40 days.

(21) Appl. No.: 09/714,276

(22) Filed: Nov. 17, 2000

(51) Int. Cl.[7] ................................................. F16L 41/00
(52) U.S. Cl. .................... 285/213; 285/345; 285/136.1; 285/141.1; 285/139.2
(58) Field of Search ............................. 285/104, 150.1, 285/151.1, 189, 345, 110, 136.1, 141.1, 139.2, 204, 374, 213

(56) References Cited

U.S. PATENT DOCUMENTS

| | | | | |
|---|---|---|---|---|
| 2,271,777 A | * | 2/1942 | Nathan | 285/110 |
| 2,722,438 A | * | 11/1955 | Kennison | 285/374 |
| 3,054,627 A | * | 9/1962 | Ligon | 285/345 |
| 3,973,783 A | | 8/1976 | Skinner et al. | |
| 4,186,931 A | * | 2/1980 | Anderson | 285/345 |
| 4,240,651 A | | 12/1980 | Mariaulle | |
| 4,547,005 A | * | 10/1985 | Soederhuyzen | 285/110 |
| 4,685,705 A | * | 8/1987 | Jones | 285/374 |
| 5,002,317 A | | 3/1991 | Burkit | |
| 5,096,232 A | | 3/1992 | Fond et al. | |
| 5,169,161 A | * | 12/1992 | Jones | 285/110 |
| 5,975,585 A | | 11/1999 | De La Llave et al. | |
| 6,015,169 A | | 1/2000 | Funke et al. | |
| 6,394,504 B1 | * | 5/2002 | Brummans et al. | 285/13 |

* cited by examiner

*Primary Examiner*—Lynne H. Browne
*Assistant Examiner*—Aaron M Dunwoody
(74) *Attorney, Agent, or Firm*—Ingrid E. Schmidt

(57) ABSTRACT

A pipe coupling for transverse connection of a drainpipe to a concrete sewer pipe of larger relative diameter. The coupling has a hollow, longitudinally extending cylindrical body with first and second ends and interior and exterior surfaces. The body has an external locating shoulder, on the exterior surface, integral with the body and extending outwardly therefrom. The external locating shoulder limits penetration of the coupling in an opening in a sidewall of the concrete pipe. The body also has an internal groove on the interior surface, located at a same longitudinal spacing as the external locating shoulder. The internal groove receives an internal sealing ring for creating a seal between the drainpipe and the body when the drainpipe is inserted. The body further has an external recess on the exterior surface, longitudinally spaced from the external locating shoulder, the external recess receiving an external sealing ring for creating a seal between the body and the concrete pipe when the coupling is inserted into the opening.

8 Claims, 3 Drawing Sheets

SEWER PIPE COUPLING

FIELD OF THE INVENTION

This invention relates to a sewer pipe coupling. In particular, the invention relates to a sewer pipe coupling for transverse connection of a small diameter drainpipe to a structure of larger relative diameter such as a sewer pipe or maintenance chamber for accessing a mainline pipe or storm sewer catch basins.

BACKGROUND OF THE INVENTION

A pipe coupling is often required when joining a pipe in transverse connection with a second pipe. When joining a drainpipe to a concrete sewer pipe, it is also desirable to provide a seal between the pipes, or between a pipe coupling and each of the two pipes to be joined. A seal may be desirable to prevent sewage from escaping and contaminating the surrounding area and also to prevent ground water from entering the sewer pipe.

Generally, a drainpipe, in transverse connection with a concrete pipe, is attached using a pipe coupling with an exterior flange for positioning. The flange extends outwardly from the coupling and abuts the exterior surface of the concrete pipe and prevents the coupling from being inserted farther into the concrete pipe.

A sealing ring, or an O-ring, on an interior surface of the pipe coupling is used for creating a seal between the coupling and an internally inserted drainpipe. The coupling is held in place in the bore-hole in the concrete pipe and sealed using cement mortar around the flange, spreading the mortar outwardly to the exterior surface of the concrete pipe. It is difficult to create a seal using mortar as it does not adhere well to the surface of the PVC pipe. Also, the mortar can shrink and crack when it dries out, thus creating a leak.

U.S. Pat. No. 6,015,169 to Funke et. al. discloses a coupling device that has an internal ring seal to create a seal with an internally located pipe and an external ring seal that abuts the concrete sewer pipe at a branch opening to create a seal. There is a flange on the outside of the pipe coupling and a separate positioning ring fits around the coupling and is located between the flange and the exterior surface of the concrete pipe. A polyurethane resin is injected between the coupling and the concrete pipe to seal and fix the coupling to the concrete pipe. This structure is somewhat complex and difficult to manufacture and install. The external stop device includes a separate positioning collar that must be inserted before the coupling is placed in the bore-hole of the pipe. Also, the device requires the injection of a polyurethane resin between the coupling and the concrete pipe.

Other couplings are available that have sealing rings or O-rings for creating a seal between a first pipe and the coupling and for creating a seal between a second pipe and the coupling. Many of these devices, however are for end-to-end connection of plastic or PVC pipes rather than for transverse connection. In U.S. Pat. No. 5,975,585 to de la Llave et al, both an internal seal and an external seal are provided in a coupling but the external seal is first positioned on the opening formed in the receiving concrete pipe. Location of the coupling in the concrete pipe is provided by an auxiliary annular element seated in a peripheral groove and location of the drain pipe inside the coupling is provided by an auxiliary stop face device. It is desirable to provide a pipe coupling for transverse connection of a drainpipe to a concrete sewer pipe and for creating a sealed connection between the coupling and each pipe which is simple and reliable to use.

SUMMARY OF THE INVENTION

There is provided a pipe connector for transverse connection of a small diameter pipe to a sewer pipe of larger relative diameter. The connector has a hollow, longitudinally extending cylindrical body with first and second ends and interior and exterior surfaces. The body has an external locating shoulder, on the exterior surface, integral with the body and extending outwardly therefrom. The external locating shoulder limits penetration of the connector in an opening in a sidewall of the large diameter pipe. The body also has an internal groove on the interior surface, located at a same longitudinal spacing as the external locating shoulder. The internal groove receives an internal sealing ring for creating a seal between the small diameter pipe and the body when the small diameter is inserted therein. The body further has an external recess on the exterior surface, longitudinally spaced from the external locating shoulder, the external recess for receiving an external sealing ring for creating a seal between the body and the large diameter pipe when the connector is inserted into the opening.

BRIEF DESCRIPTION OF THE DRAWINGS

A preferred embodiment of the invention will now be described, by way of example only, with reference to the accompanying drawings, in which.

DETAILED DESCRIPTION OF THE INVENTION

Figure 1:
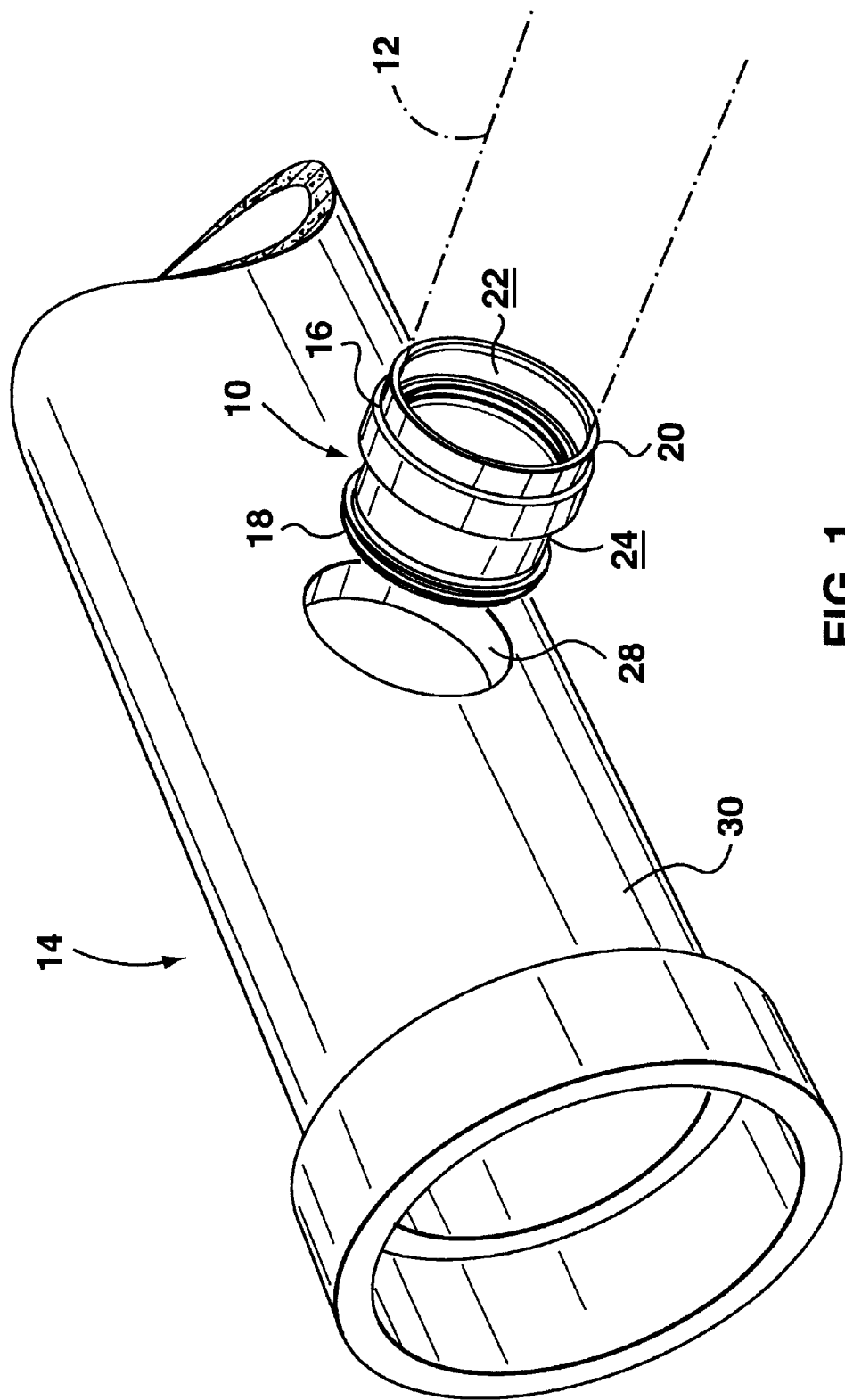
FIG. 1 is a perspective view showing a pipe coupling according to the invention in use with a drain pipe and concrete pipe.

Reference is first made to FIG. 1 to describe a pipe coupling indicated generally by the numeral 10 (drawn in ghost outline). Pipe coupling 10 is for transverse connection of a small diameter pipe such as drainpipe 12 to a large diameter structure such as concrete sewer pipe 14. Coupling 10 has a hollow, longitudinally extending cylindrical body 16 with a first spigot end 18 and a second bell end 20 and interior and exterior surfaces 22, 24 respectively.

Figure 2:
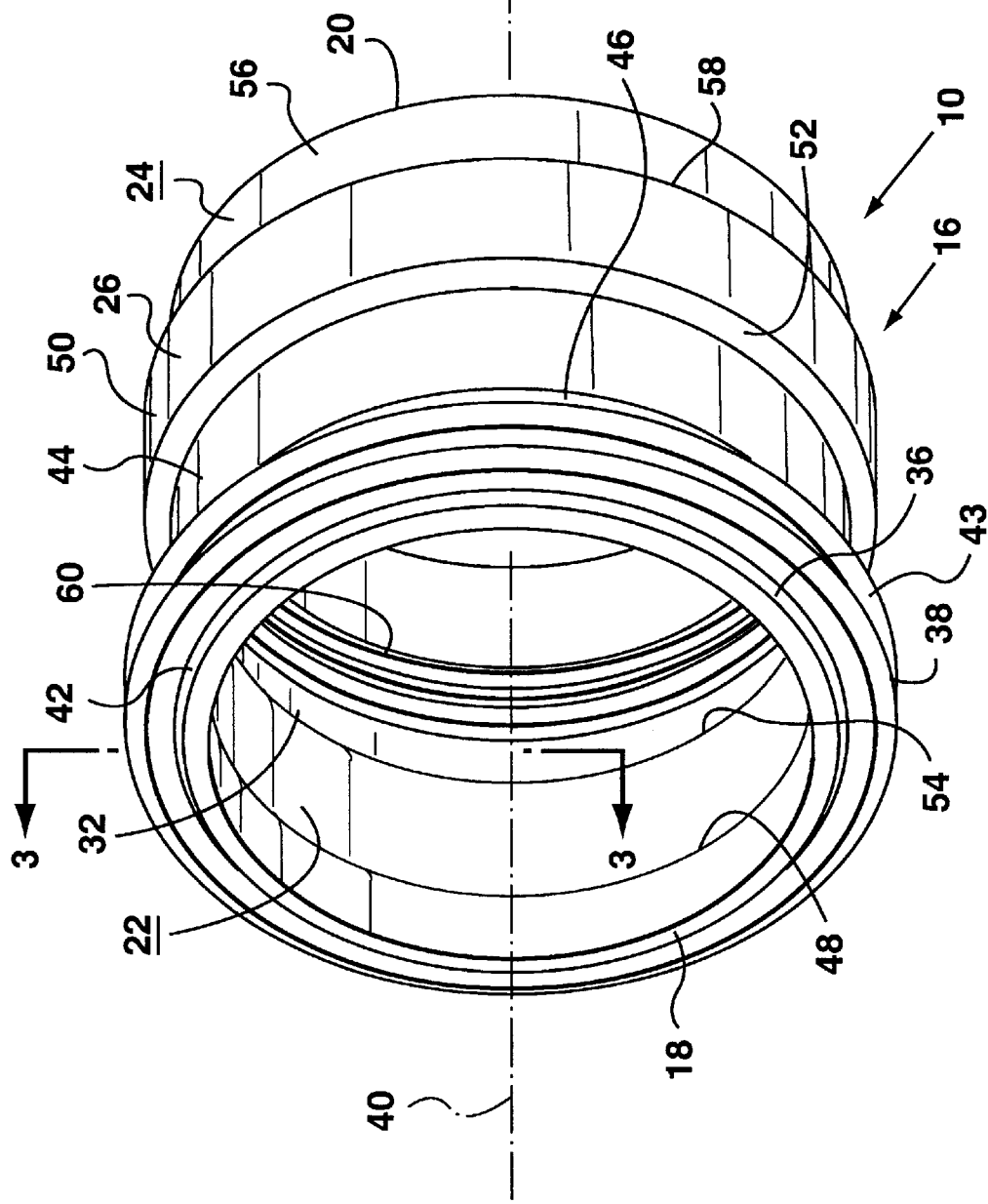
FIG. 2 is a perspective view of the pipe coupling of FIG. 1 drawn to a larger scale.
Figure 3:
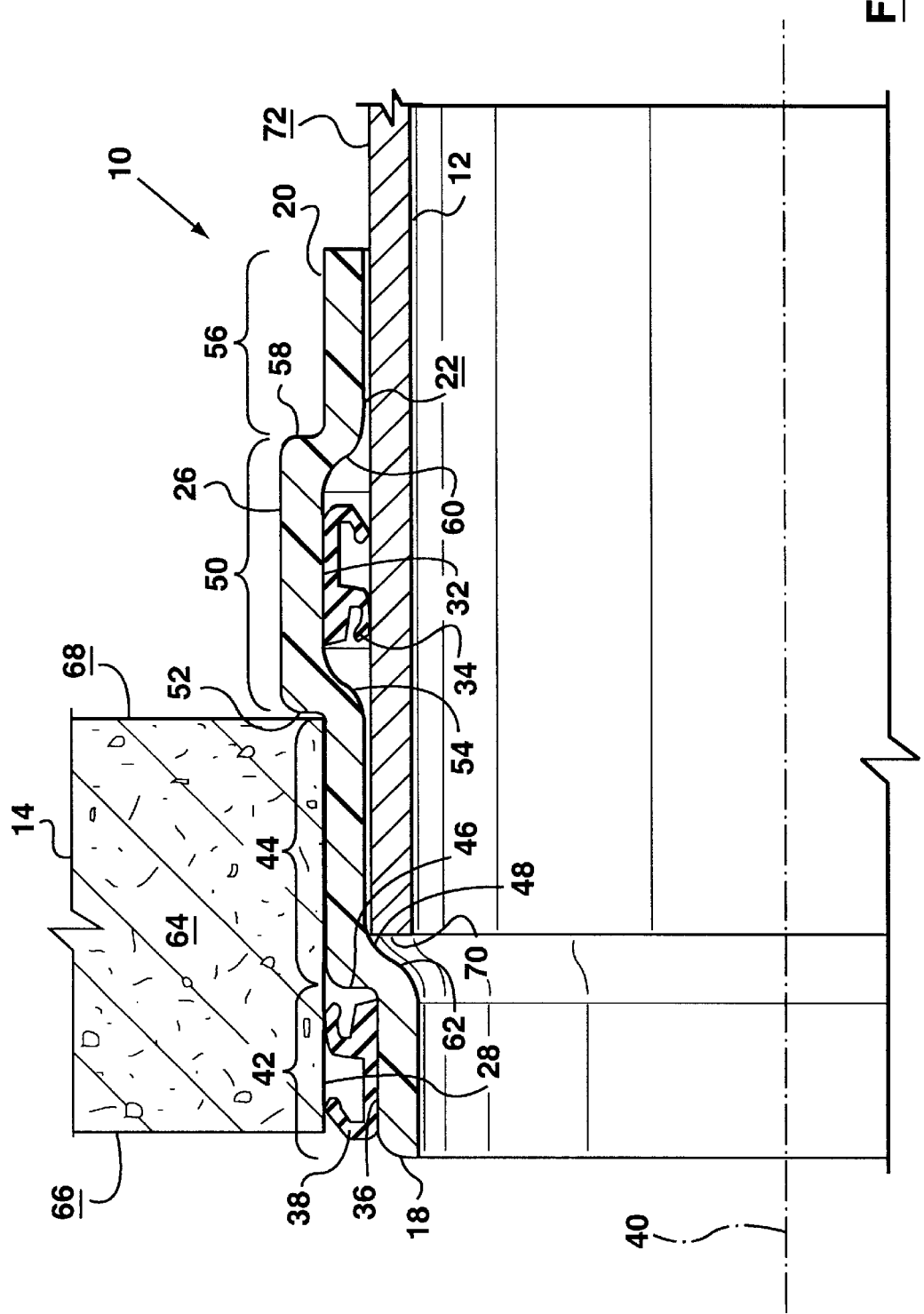
FIG. 3 is a cross-sectional drawn on line 3—3 of FIG. 1 and drawn to a larger scale.

Coupling 10 also has an external locating shoulder 26 (FIGS. 2, 3) on exterior surface 24. External locating shoulder 26 is integral with the body 16 and extends outwardly therefrom for limiting the penetration of coupling 10 in an opening 28 in a sidewall 30 of concrete pipe 14. An internal groove 32, on interior surface 22 is at a same longitudinal spacing as external locating shoulder 26. Internal groove 32 receives an internal sealing ring 34 to create a seal between drainpipe 12 and body 16 when drainpipe 12 is inserted therein. A reduced diameter portion at the spigot end 18 defines external recess 36 on exterior surface 24. External recess 36 receives and locates an external sealing ring 38 for creating a liquid seal between the body 16 and concrete pipe 14, when the body 16 is inserted therein.

In the preferred embodiment, generally cylindrical body 16 of coupling 10, is centered about a central axis 40. Cylindrical body 16 is about five and a half inches in length and is made of rotation moulded polyethylene (P.E.).

The internal diameter of body 16 varies from the spigot end 18 to the bell end 20, to facilitate the positioning and sealing of drainpipe 12 in coupling 10. Similarly, the external diameter of body 16 varies from the spigot end 18 to the bell end 20 to facilitate the position and sealing of coupling 10 in opening 28 of concrete pipe 14.

Body 16 has four generally cylindrical, integral body portions. First body portion 42 is generally cylindrical with an axial length and external diameter small enough to receive external sealing ring 38 and fit in opening 28 of concrete sewer pipe 14 without protruding into the pipe 14 where it could otherwise obstruct flow. External sealing ring 38, for creating a seal between concrete sewer pipe 14 and coupling 10 is seated on exterior surface 24 of coupling 10, at first body portion 42 with circumferential sealing lips 43 extending outwardly to make contact with the surrounding concrete pipe wall 28. The internal diameter of first body portion 42 is smaller than the external diameter of drainpipe 12 to prevent drainpipe 12 from passing therethrough. The spigot end 18 is defined by the edge of the first body portion 42.

Adjacent the first body portion 42 and integral therewith is a generally cylindrical second body portion 44. Second body portion 44 has an external diameter that is larger relative to that of the first body portion 42 and has a tolerance fit small enough for insertion into the opening 28 in the concrete pipe 14 without allowing rocking of the coupling 10 in the opening 28. An external gasket stop edge 46 is created by the transition to relatively larger external diameter from the first body portion 42 to the second body portion 44. External gasket stop edge 46 prevents external sealing ring 38 from sliding past the first body portion 42, in the direction of the second body portion 44. First body portion 42 and external gasket stop edge 46 define external recess 36.

The interior diameter at second body portion 44 is also larger, relative to that of the first body portion 42, thus creating a drain pipe stop edge 48 between the first body portion 42 and the second body portion 44. The internal diameter at second body portion 44 is suitably sized to receive the drainpipe 12 when inserted into the coupling 10. Drainpipe 12 is prevented from being inserted past second body portion 44 as drainpipe 12 abuts drainpipe stop edge 48. Thus, internal shoulder 62 is defined by first body portion 42 and drain pipe stop edge 48.

Adjacent the second body portion 44 and integral therewith is a generally cylindrical third body portion 50. Third body portion 50 has an external diameter that is larger relative to that of the second body portion 44. An external stop edge 52 is created by the transition from smaller to larger external diameter between the second body portion 44 and the third body portion 50. External locating shoulder 26 is defined by the external stop edge 52 and the third body portion 50. The external diameter of third body portion 50 is larger than the diameter of opening 28 in the concrete sewer pipe 14 thus preventing third body portion 50 from being inserted into concrete pipe 14.

The internal diameter at third body portion 50 is also larger than that at second body portion 44 thus creating an internal gasket stop edge 54 between the second body portion 44 and the third body portion 50. The internal diameter is suitably sized to receive an internal sealing ring 34 for creating a seal between the coupling 10 and the drainpipe 12, when drainpipe 12 is inserted into the coupling Adjacent the third body portion 50 and integral therewith is a generally cylindrical fourth body portion 56. The external diameter of the fourth body portion 56 is substantially similar to that of the second body portion 44. Thus, an external shoulder edge 58 is created by the transition to relatively smaller diameter from the third body portion 50 to the fourth body portion 56. The internal diameter of the fourth body portion 56 is also substantially similar to that of the second body portion 44. An internal groove edge 60 is created by the transition to a relatively smaller internal diameter from third body portion 50 to fourth body portion 56. Thus, the internal groove 32 is defined by internal gasket stop edge 54, third body portion 50 and internal groove edge 60 and internal sealing ring 34 is located in internal groove 32. The bell end 20 is defined by the edge of fourth body portion 56.

It will now be apparent that external recess 36 is located at a same longitudinal position along axis 40 as internal shoulder 62. Also, external locating shoulder 26 is at a same longitudinal position along axis 40 as internal groove 32.

The use and function of coupling 10 will now be described in accordance with the preferred embodiment of the invention, with reference to the foregoing and the attached Figures.

Coupling 10 can be used in transverse connection of any suitable drainpipe 12 to a suitable larger concrete sewer pipe 14. Prior to inserting the coupling 10 into the opening 28 in the concrete pipe 14, the external sealing ring 38 is placed around cylindrical body 16 in external recess 36. Similarly, the internal sealing ring 34 is placed in internal groove 32.

Opening 28 in concrete pipe 14 is suitably sized to receive first and second body portions 42, 44 respectively, of coupling 10 and small enough to prevent third body portion 50 from passing therethrough. The concrete pipe 14 has an inner wall surface 64 between an interior sidewall surface 66 and an exterior sidewall surface 68. The first spigot end 18 of coupling 10 is inserted into opening 28 and coupling 10 is urged into place such that external stop edge 52 of external locating shoulder 26 abuts exterior sidewall surface 68. External gasket stop edge 46 prevents external sealing ring 38 from sliding away from the spigot end 18 along the body 16, when inserting the first and second body portions 42, 44 into the concrete pipe 14. External sealing ring 38 is thus compressed between the inner wall surface 64 and the first body portion 42, thereby creating a seal between the body 16 and the concrete pipe 14.

The body 16 extends transversely to concrete pipe 14 and third and fourth body portions 50, 56, respectively, extend outwardly from the opening 28.

Drainpipe 12 with an inner end 70 and an outer surface 72 is then inserted into the second bell end 20 of the coupling 10. The drainpipe 12 is urged into place such that the inner end 70 abuts the drainpipe stop edge 48 of internal shoulder 62. Internal sealing ring 34 is thus compressed between outer surface 72 of the drainpipe 12 and the interior surface 22 at third body portion 50, thereby creating a seal between body 16 and drainpipe 12. Drainpipe 12 is therefore in sealed connection with concrete pipe 14, through coupling 10 and a forward portion of the drainpipe 12 disposed inside the second body portion 44 forms a double wall inside the opening 28 of the concrete pipe 14.

While the embodiment discussed herein is directed to a particular implementation of the invention, variations of this embodiment are within the scope of the invention. For example, the size and shape of any of the features can differ while still performing the same function. The external or internal sealing rings can be fixed to the body of the coupling. Also, the coupling can be made of any suitable material, using any suitable forming process.

The invention provides a novel coupling for transverse connection of a drainpipe to a concrete sewer pipe with a larger diameter relative to the drainpipe. The coupling can be relatively easily installed and can provide a sealed connection between the drainpipe and concrete sewer pipe. There is provided an external shoulder for positioning the coupling in the concrete sewer pipe, and an internal shoulder for positioning the drainpipe in the coupling. Therefore, the coupling can be relatively easily located in the desired position in the concrete pipe and the drainpipe can be located in the desired position in the coupling.

We claim:

1. A pipe coupling for transverse connection of a small diameter pipe to a large diameter structure of larger relative diameter than the small diameter pipe and having an opening in a sidewall of predetermined diameter, said coupling comprising;

a hollow, longitudinally extending cylindrical body of nominal outer diameter corresponding to the diameter of said opening and of nominal inner diameter corresponding to an outer diameter of said small diameter pipe, with first and second ends and interior and exterior surfaces, said body having:

an external locating shoulder on said exterior surface integral with said body and extending outwardly therefrom, said external locating shoulder defining a first outer diameter which is greater than the diameter of said opening for limiting penetration of said coupling in said opening;

an internal groove, on said interior surface, at a same longitudinal spacing as said external locating shoulder, said internal groove defining a first inner diameter which is greater than said nominal inner diameter for receiving an internal sealing ring for creating a seal between said small diameter pipe and said body when said small diameter pipe is inserted therein at said first end; and an external recess on said exterior surface extending from said second end to an external stop edge defining a second outer diameter which is smaller than the diameter of said opening, the stop edge being longitudinally spaced from said external locating shoulder at said first end of the body, said external recess for receiving an external sealing ring for creating a seal between said body and said large diameter structure when said coupling is inserted into said opening.

2. The pipe coupling according to claim 1 wherein said body also has an inwardly extending internal locating shoulder on said interior surface, said internal locating shoulder integral with said body and defining a second inner diameter which is smaller than said nominal inner diameter, said internal locating shoulder being longitudinally spaced from said internal groove between said internal groove and said second end for limiting penetration of said small diameter pipe in said body.

3. The pipe coupling according to claim 2 wherein, said internal locating shoulder is at a same longitudinal spacing as said external stop edge.

4. The pipe coupling according to claim 1, wherein said coupling further comprises said internal sealing ring.

5. The pipe coupling according to claim 1, wherein said coupling further comprises said external sealing ring.

6. A pipe coupling for transverse connection of a small diameter pipe to a large diameter structure of larger relative diameter than the small diameter pipe and having an opening in a sidewall of predetermined diameter, said coupling comprising;

a hollow, longitudinally extending cylindrical body of nominal outer diameter corresponding to the diameter of said opening and of nominal inner diameter corresponding to an outer diameter of said small diameter pipe, with first and second ends and interior and exterior surfaces, said body having:

an external locating shoulder on said exterior surface integral with said body and extending outwardly therefrom, said external locating shoulder defining a first outer diameter which is greater than the diameter of said opening for limiting penetration of said coupling in said opening;

an internal groove, on said interior surface, at a same longitudinal spacing as said external locating shoulder, said internal groove defining a first inner diameter which is greater than said nominal inner diameter for receiving an internal sealing ring for creating a seal between said small diameter pipe and said body when said small diameter pipe is inserted therein at said first end;

an external recess on said exterior surface extending from said second end to an external stop edge defining a second outer diameter which is smaller than the diameter of said opening, the stop edge being longitudinally spaced from said external locating shoulder at said first end of the body, said external recess for receiving an external sealing ring for creating a seal between said body and said large diameter structure when said coupling is inserted into said opening; and an inwardly extending internal locating shoulder on said interior surface, said internal locating shoulder integral with said body and defining a second inner diameter which is smaller than said nominal inner diameter, said internal locating shoulder being longitudinally spaced from said internal groove between said internal groove and said second end for limiting penetration of said small diameter pipe in said body.

7. The pipe coupling according to claims 6, wherein said coupling further comprises said internal sealing ring.

8. The pipe coupling according to claimed 6, wherein said coupling further comprises said external sealing ring.

* * * * *